US009243448B2

(12) United States Patent
Cui et al.

(10) Patent No.: US 9,243,448 B2
(45) Date of Patent: Jan. 26, 2016

(54) DOOR CONTROL SYSTEMS

(75) Inventors: Xin Cui, Gilbert, AZ (US); Jeffrey L. Mueller, Mountaintop, PA (US); Michael D. Mankoski, Glendale, AZ (US); G. Bruce Burwell, Mountaintop, AZ (US)

(73) Assignee: CORNELL IRONWORKS ENTERPRISES, Mountaintop, PA (US)

( * ) Notice: Subject to any disclaimer, the term of this patent is extended or adjusted under 35 U.S.C. 154(b) by 895 days.

(21) Appl. No.: 13/357,852

(22) Filed: Jan. 25, 2012

(65) Prior Publication Data

US 2013/0186001 A1 Jul. 25, 2013

(51) Int. Cl.

| | |
|---|---|
| ***H02P 5/00*** | (2006.01) |
| ***G05D 3/00*** | (2006.01) |
| ***E06B 9/68*** | (2006.01) |
| ***E05F 15/70*** | (2015.01) |
| ***E05F 15/77*** | (2015.01) |
| *E06B 9/11* | (2006.01) |
| *E06B 9/40* | (2006.01) |

(52) U.S. Cl.

CPC . *E06B 9/68* (2013.01); *E05F 15/70* (2015.01); *E05F 15/77* (2015.01); *E05Y 2400/322* (2013.01); *E05Y 2400/326* (2013.01); *E05Y 2400/40* (2013.01); *E05Y 2400/415* (2013.01); *E05Y 2400/42* (2013.01); *E05Y 2400/44* (2013.01); *E05Y 2400/456* (2013.01); *E05Y 2400/51* (2013.01); *E05Y 2400/54* (2013.01); *E05Y 2400/81* (2013.01); *E05Y 2900/00* (2013.01); *E05Y 2900/10* (2013.01); *E05Y 2900/106* (2013.01); *E06B 9/11* (2013.01); *E06B 9/40* (2013.01); *E06B 2009/6845* (2013.01); *E06B 2009/6872* (2013.01)

(58) Field of Classification Search

CPC ........... H02P 5/74; H02P 5/68; Y02T 10/646; Y02T 10/70

USPC ............................................................ 318/34

See application file for complete search history.

(56) References Cited

U.S. PATENT DOCUMENTS

| | | | | |
|---|---|---|---|---|
| 4,713,591 | A * | 12/1987 | McCloskey | 318/257 |
| 5,218,282 | A * | 6/1993 | Duhame | 318/603 |
| 2008/0062000 | A1 * | 3/2008 | Styers et al. | 340/686.1 |
| 2008/0140265 | A1 * | 6/2008 | Hong et al. | 701/2 |
| 2010/0242368 | A1 * | 9/2010 | Yulkowski | 49/349 |

* cited by examiner

*Primary Examiner* — Eduardo Colon Santana
*Assistant Examiner* — Gabriel Agared
(74) *Attorney, Agent, or Firm* — Snell & Wilmer L.L.P.

(57) ABSTRACT

The present disclosure includes systems, methods, and articles of manufacture for controlling a door. In various embodiments, exemplary systems may include a controller that may initialize and/or reset a limit count. A controller may initialize and/or reset a limit count in response to detection by a first position sensor of a first target. A controller may further initialize and/or reset a limit count by incrementing the limit count in response to a signal from a gear tooth sensor until a second position sensor detects a second target, whereupon the controller may store the limit count.

35 Claims, 12 Drawing Sheets

DOOR CONTROL SYSTEMS

BACKGROUND

1. Field

The present disclosure generally relates to control systems. More particularly, the present disclosure relates to door control systems.

2. Related Art

Doors are widely used for a variety of purposes (e.g., industrial, commercial, and/or residential purposes) and vary, as a result of their widespread utility, in their construction. For example, rollup or rolling doors, coiling doors, sectional doors, and/or partitions (e.g., folding walls) are commonly used as cargo bay doors, self storage unit doors, garage doors, and/or the like. Such doors often comprise a group of interconnected leaves or slats, and this group of interconnected slats may comprise a "door curtain" or "curtain." The curtain may be mounted to a rotating mechanism or shaft (e.g., an overhead shaft) which may be operatively coupled to an "operator" (e.g., a motor). The operator may turn the rotating mechanism or shaft so that the curtain retracts from or extends into an opening.

Typically, doors of the types described above must be initialized as part of an installation process. For example, rolling doors often require calibration of one or more mechanical limit switches (e.g., a mechanical open limit switch as well as a mechanical close limit switch). An open limit switch may establish a limit, beyond which a door may not be retracted, while a close limit switch may likewise establish a limit, beyond which a door may not be extended. An operator may be configured to rotate a shaft or rotating mechanism (or open and close a door), as described above, until a limit switch is triggered (e.g., by mechanical interaction with the operator). Thus, a mechanical limit switch may, in essence, mechanically control an operator so that it does not continue to rotate a shaft or rotating mechanism after a door has been adequately opened or closed.

With further regard to mechanical limit switches, these are commonly located high off the ground, near an operator and/or door rotating mechanism. In addition, a repeated number of attempts or adjustments may be required (e.g., by a technician or other installer) before a limit switch is calibrated adequately. For example, where a limit switch is located at or near the apex of a door, a technician who is working alone may find it necessary to travel up and down a ladder for quite some time (e.g., several minutes) making minor adjustments to each limit switch, triggering operation of the door system (e.g., via a control switch that is located elsewhere), and returning to the apex of the door system to readjust each limit switch until the operator is satisfactorily disengaged when a door is fully retracted and/or fully extended.

Many doors are also often coupled to or controlled by controllers or microcontrollers. A controller may communicate with and control an operator. For example, a controller may transmit one or more commands to an operator to cause the operator to retract a door, close a door, halt or stop a motion of a door, and the like. Although controllers have long been coupled to door systems, typically, a one-to-one relationship exists between a controller and an operator. Moreover, controllers are often manufactured to communicate with a particular brand and/or model of operator and are quite frequently packaged with hardcoded (i.e., non-modifiable, non-updateable) operating instructions.

Also, when service is required, doors typically require manual adjustment and/or a service or maintenance call to a technician or customer service agent. An agent may provide assistance over the telephone, which may, in turn, require assistance from and/or investigation by the person requesting service. Thus, in other words, typical prior art systems do not provide comprehensive automatic diagnosis or troubleshooting capabilities.

A door control system incorporating automated diagnostic routines and/or that is capable of communicating with a customer service agent or another remote system would therefore be advantageous. It would also be advantageous to incorporate, in a door control system, a controller capable of communicating with a plurality of operators. That is, it would be advantageous to construct a system in which a plurality of doors and their respective operators could be controlled by a single controller from a central control panel. It would, in addition, be advantageous to "push" or communicate software or requested functionality to a controller, e.g., as a patch or update and/or in response to a request or purchase request for new or added functionality. A door control system in which a limit (e.g., a position sensor) could be set without the dangerous necessity of repeated manual adjustment would also be very desirable.

SUMMARY

The present disclosure includes systems, methods, and articles of manufacture for controlling a door. In various embodiments, exemplary systems may include a controller that may initialize and/or reset a limit count. A controller may initialize and/or reset a limit count in response to detection by a first position sensor of a first target. A controller may further initialize and/or reset a limit count by incrementing the limit count in response to a signal from a gear tooth sensor until a second position sensor detects a second target, whereupon the controller may store the limit count.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
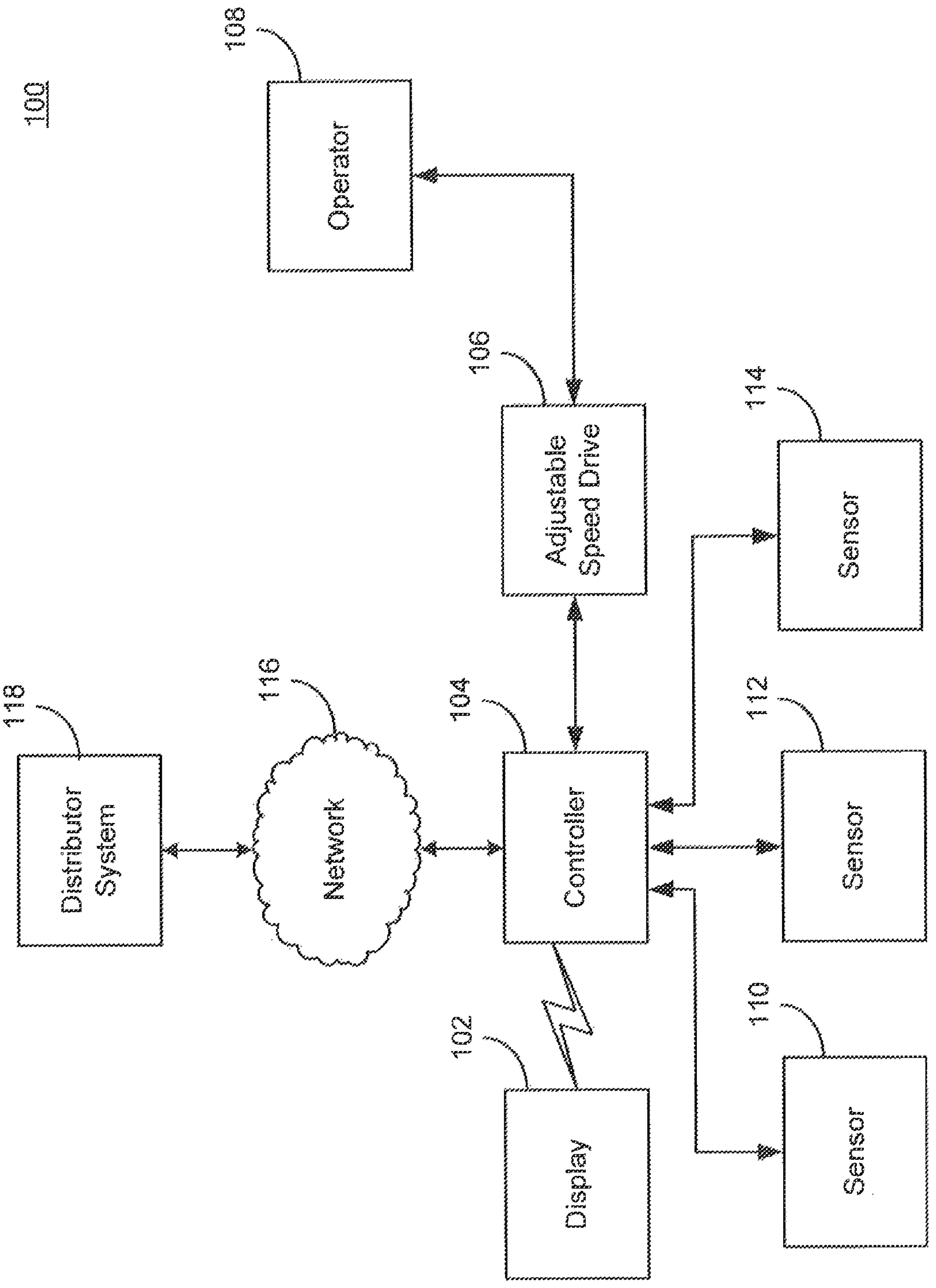
FIG. 1 shows a block diagram of an exemplary door control system.

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. For example, although the detailed description may illustrate various embodiments with regard to a particular type of door (e.g., a rolling and/or vertically traveling door), it should be understood that other embodiments may be realized (e.g., embodiments in which the systems and methods described herein are applied to a variety of other types of doors, such as, for example, motorized and/or retractable doors and/or partitions, overhead doors, horizontally traveling doors, side coiling doors, sectional doors, partitions and/or folding or operable walls, windows, and/or the like) and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Furthermore, any reference to singular includes plural embodiments, and any reference to more than one component may include a singular embodiment.

As used herein, a "user" may comprise any individual or person, any entity, and/or any hardware and/or software capable of interacting with a door control system.

While the specific embodiments of the present invention will be described in greater detail below, in general, an embodiment of the present invention comprises a door control system. A door control system, may, in turn, comprise a controller, such as a programmable logic controller, a microcontroller or microprocessor, and/or the like. In various embodiments, a controller may be coupled to a display and/or an adjustable speed drive, such as a variable frequency drive. An adjustable speed drive may be coupled to a door operator, which may comprise, for example, a hoist or jackshaft operator, a motor, a gear reducer, a controller, a brake, and/or the like.

A controller may provide a wide variety of functionality. For example, a controller may set a limit based upon a single opening and/or closing (i.e., a single "half cycle") of a door. More particularly, a controller may set a limit by incrementally counting a number of gear teeth sensed by a gear tooth sensor until a position sensor (e.g., a position sensor, a proximity sensor, a safety sensor, and/or a contact sensor) disposed at an open portion (e.g. an upper portion) and/or a closed portion (e.g., a lower portion) of a door and/or door frame detects a target (e.g., where a position sensor is disposed near a lower portion of a door frame, the position sensor may detect or activate in response to detection of a leading edge of the door, indicating that the door has reached a closed position). The tallied number of teeth may be referred to as a "limit count," and may be stored by the controller as representative of the distance a door should be allowed to travel (e.g., in either an open or closed direction) before it reaches an open (e.g., raised) and/or a closed (e.g., lowered) position. The present invention may thus relieve a technician or door installation professional from the slow necessity embodied by a typical mechanical limit switch setting procedure (as described above). Indeed, with the present invention, a limit count may be set in the course of a single open or closed half cycle.

During normal operation (e.g., after initialization and/or when a limit count is not being reset), a controller may count a number of gear teeth (a "measured count") and disengage or stop an operator based upon a comparison of the limit count to the measured count. For instance, a controller may stop an operator when a measured count equals a limit count.

Over time, however, a controller may observe or calculate that a position sensor is not triggered when a measured count equals a limit count or, on the other hand, that a position sensor is triggered when a measured count is less than a limit count. This may occur, for example, as a result of physical wear on a door curtain. A controller may, in response to such an observation, reset a limit count. Further, in various embodiments, a controller may cause a door operator to continue to open or close a door curtain even though a measured count is equal to a limit count (e.g., where a position sensor is not triggered, but a measured count equals a limit count) and/or a controller may cause a door operator to stop the progress of a door curtain even though a measured count is not yet equal to a limit count (e.g., where a position sensor is triggered). Thus, the present invention may compensate for outdated and/or inaccurate and/or faulty limit counts as well as automatically, and over time, adjust a limit count for wear on a door curtain.

A controller may, in addition, include self-monitoring functionality, receive updated and/or new functionality, activate disabled functionality, and the like. For example, a controller may be coupled to a network and may receive, via the network, a variety of new and/or updated functionality.

The present invention may further include a display, which may comprise or show a graphical user interface. The display may be coupled to a controller and may present a variety of data associated with a door control system. For example, a display may present a variety of status data, a physical status of a door (e.g., relative position of a door), a variety of diagnostic information, and/or the like.

A door control system may further comprise an unshared or standalone system, as well as a shared system. In various embodiments, a standalone system may comprise a controller communicatively coupled to a single operator. Likewise, in various embodiments, a shared system may comprise a controller communicatively coupled to a plurality of operators. Thus, the door control systems of the present invention may enable automated and/or centralized control of a building or structure having a plurality of doors and/or door operators.

Further, and in a variety of embodiments, the present invention may enable leased access and/or the provision of a service link between a door control system and a distributor system. For instance, a distributor system may lease access to a door control system for a specified period (e.g., months or years). This feature may be useful to users who intend only to occupy a building for a specified period and who therefore do not wish to purchase a door control system. Similarly, a distributor may provide a service link, which may permit the distributor to interface with a door control system. A distributor may interface with a door control system via a service link, for example, to receive diagnostic data and/or to troubleshoot a door control system.

With reference now FIG. 1, a block diagram of an exemplary door control system 100 is provided. A door control system 100 may comprise a display 102, a controller 104, an adjustable speed drive 106, an operator 108, and/or one or more sensors 110, 112, and 114. In various embodiments, a door control system 100 may be coupled to a network 116. Further, in various embodiments, a door control system 100 may be coupled, e.g., via a network 116, to a distributor system 118.

A display 102 may comprise hardware and/or software configured to display and/or present one or more images. In various embodiments, a display 102 may comprise a cathode ray tube ("CRT") display, liquid crystal display ("LCD"), a plasma panel display, an organic light emitting diode ("OLED") display, an active-matrix organic light emitting diode ("AMOLED") display, a touchscreen display, a haptic display, and/or the like.

A display may, in various embodiments, further comprise one or more controllers or microprocessors, as described elsewhere herein. A display 102 may display, show, or present a graphical user interface ("GUI"), which a user or individual may interface or interact with to review and/or enter a variety of information (e.g., control data, door status, and the like). For example, in a variety of embodiments, a user may interact with a GUI presented by display 102 to issue commands (e.g., stop, open, close, raise, lower) to a controller 104. A GUI may be provided to a display 102 by a controller 104, and/or a GUI may be rendered and/or provided by a controller or microprocessor integrated with the display 102.

A controller 104 may comprise hardware and/or software configured to control a door operator 108. In various embodiments, a controller 104 may comprise a programmable logic controller ("PLC"), a microcomputer, a microcontroller, a microprocessor, a field programmable gate array ("FPGA"), an integrated circuit ("IC"), an application specific integrated circuit ("ASIC"), a personal computer, a tablet, a workstation, a smart phone, and/or the like. A controller 104 may communicate with a tangible, non-transitory memory, which may have instructions stored thereon, which may cause the controller to perform any of the processes and/or methods described elsewhere herein.

An adjustable speed drive ("ASD") 106 may comprise hardware and/or software configured to adjustably control the rotation or rotational speed of an operator 108. In various embodiments, an ASD 106 may comprise a mechanical adjustable speed drive, a hydraulic adjustable speed drive, a direct current or "DC" drive, an eddy current drive, a variable frequency drive ("VFD"), and/or the like.

An operator 108 may comprise hardware and/or software configured to open or close a door. In various embodiments, an operator 108 may comprise one or more of a motor, a gear reducer, a controller, and/or a brake. Further, in various embodiments, an operator 108 may comprise a hoist operator, a jackshaft operator, and/or the like.

Sensors 110, 112, and/or 114 (as well as any other sensors described elsewhere herein) may comprise a wide variety of sensors. For example sensors 110, 112, and/or 114 (and, again, any other sensors described elsewhere herein) may comprise any of gear tooth sensors, proximity sensors, position sensors, safety sensors, contact sensors, entrapment protection sensors, and/or the like. A gear tooth sensor may, in some embodiments, sense or detect a gear tooth that passes through or disrupts a magnetic field (e.g., a magnetic field generated by the sensor). Similarly, a position sensor, a proximity sensor, a safety sensor, an entrapment protection sensor, and/or a contact sensor, each of which may, for simplicity, be referred to elsewhere herein as a "position sensor," may, in various embodiments, sense or detect a target and/or an object. For instance, in certain embodiments, a position sensor may detect a target portion of a door, e.g., a top portion of a door and/or a bottom or lower portion of a door. Further, in various embodiments (e.g., where a door opens and/or closes horizontally), a position sensor may detect that a door has reached a fully open position and/or a fully closed position. Thus, a position sensor may detect that a door has reached a fully open position and/or a fully closed position. In various embodiments, a position sensor may detect an object or obstruction that is at risk of becoming entrapped by or entangled with a door.

In various embodiments, any of the display 102, controller 104, ASD 106, an operator 108, a sensor 110, a sensor 112, and/or a sensor 114 (and/or any other sensor described herein) may communicate via any wired or wireless communication link and/or via any standard that is suitable to the task, including, as described below, via a network 116. For example, in an exemplary embodiment, a display 102 may communicate with a controller 104 by way of a wireless communication protocol, such as, for example, Zigbee, Bluetooth, WiFi, and/or the like. In an exemplary embodiment, a display 102 may further communicate with a controller 104 via Ethernet and/or via a virtual private network ("VPN"); and, in various embodiments, a controller 104 may be associated with a same subnet as a display 102, which may enable direct communication between the controller 104 and the display 102. Likewise, in an exemplary embodiment, an ASD 106 may communicate with a controller 104 by way of a wired communication protocol, including Ethernet, Profinet, ModBus, RS-485, and the like; and, as described above, an ASD 106 may be associated with a same subnet as a controller 104, so that the ASD 106 and controller 104 may engage in direct communications. Further, in various embodiments, an ASD 106 and/or a controller 104 may communicate with an operator 108 by way of a wired connection comprising a proprietary or predefined pin out or wiring configuration (as described in greater detail below).

As used herein, a "network" may include any computing system or electronic communications system or method which incorporates hardware and/or software components for communicating data. Communication may be accomplished through any one or more suitable communication channels, such as, for example, a telephone network, an extranet, an intranet, the Internet, online communications, satellite communications, off-line communications, wireless communications, transponder communications, local area network (LAN), wide area network (WAN), virtual private network (VPN), networked or linked devices, and/or any other mechanism or channel that is suitable for communication and/or data transfer.

A network may implement a variety of protocols, including TCP/IP protocols. A network may also be implemented using IPX, Appletalk, IP-6, NetBIOS, OSI, any tunneling protocol (e.g. IPsec, SSH), and/or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

A variety of system components may be independently, separately and/or collectively coupled to a network via, for example, a connection to an Internet Service Provider (ISP) over a local loop. A system component may communicate via a network with an ISP via a modem, a cable modem, a satellite network, an integrated services digital network, a digital subscriber line ("DSL") connection, and/or various wireless communication methods (see, e.g., Gilbert Held, Understanding Data Communications (1996), which is hereby incorporated by reference).

A network may include or couple to a "cloud." In this regard, a "cloud" or "cloud computing" may include a model for enabling convenient, on-demand network access to a shared pool of configurable computing resources (e.g., networks, servers, storage, applications, and services) that can be rapidly provisioned and released with minimal management effort or service provider interaction. Thus, for example, cloud computing may enable location-independent computing, whereby one or more shared servers pool resources, software, and/or data for the use of network connected computers and other devices on demand. For more information regarding cloud computing, see the NIST's (National Institute of Standards and Technology) definition of cloud computing at http://csrc.nist.gov/groups/SNS/cloud-computing/cloud-def-v15, which is hereby incorporated by reference in its entirety.

A distributor system 118 may comprise hardware and/or software suitable for communicating, via a network 116, with a controller 104. In various embodiments, a distributor system 118 may comprise a three tiered computer architecture, including, for example, a web server, an application server, and/or a database.

Further, in various embodiments, a distributor system 118 may communicate with a controller via, for example, the Internet (e.g., IP). In addition, a distributor system 118 may, in various embodiments, communicate with a controller 104 via, for example, a telephone network and/or a cellular communications network, such as a global system for mobile communications ("GSM") network based on, for example, a general packet radio service ("GPRS"). Thus, a distributor system 118 may communicate with a controller via an Internet connection as well as via a cellular communications network. The latter method of communication, may, as described more fully below, facilitate communication between a distributor system 118 and a controller 104 where a user is reluctant or unwilling to open his proprietary local network to communication over the Internet with a distributor system 118. In this circumstance, a distributor system 118 may forgo an IP connection to a controller 104, opting instead for a mobile connection to a controller 104. Where a distributor system 118 connects to a controller 104 via a mobile communication network, a controller 104 may be equipped with or have installed a subscriber identity module, also known as a "SIM card," as well as, in certain embodiments, other components which may be necessary to make a connection to a mobile cellular communications network (e.g., an RF transceiver).

Figure 2:
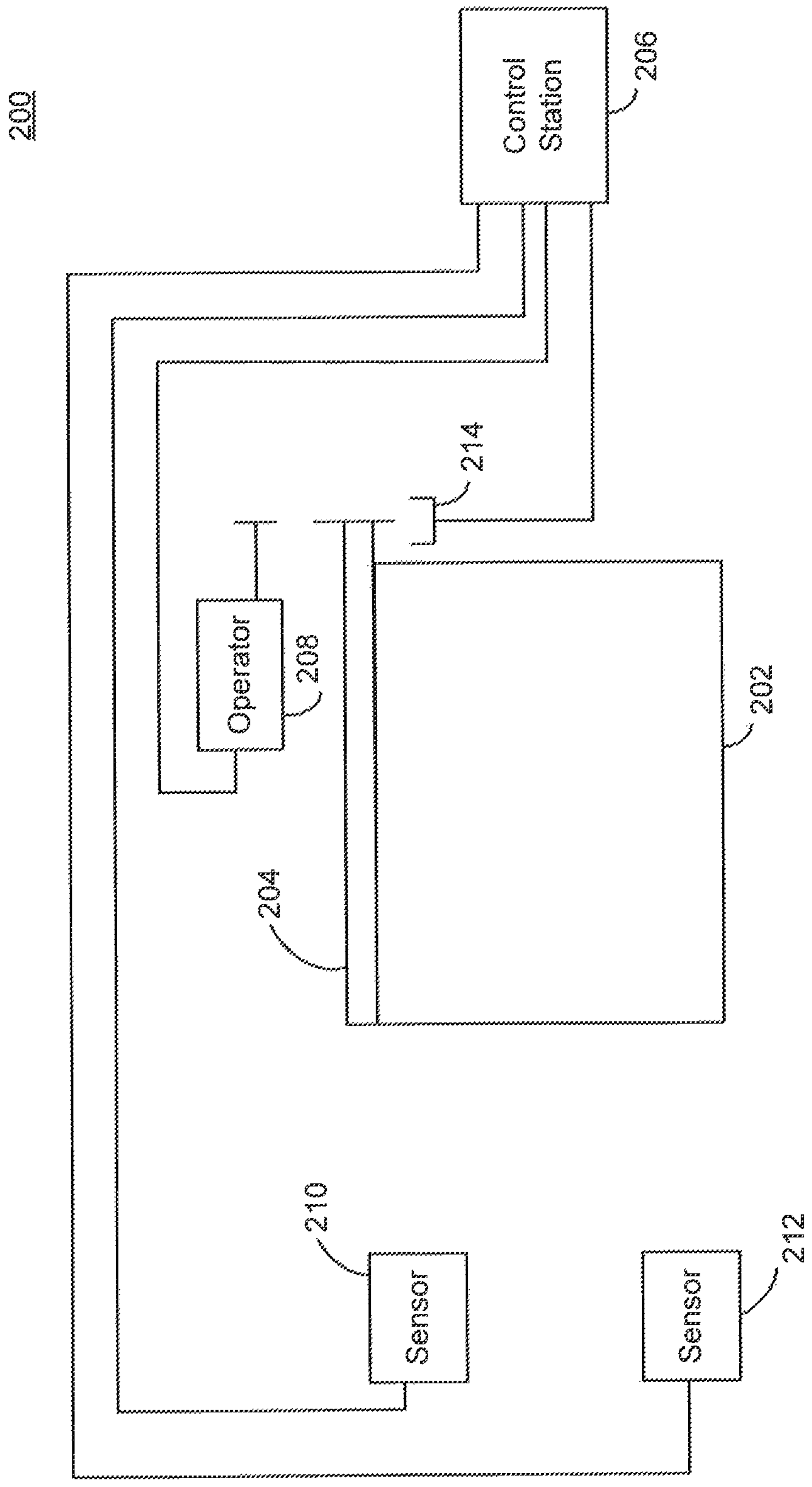
FIG. 2 shows a system diagram of an exemplary door control system.

Turning to FIG. 2, a perspective view of an exemplary door 202 coupled to an exemplary door control system 200 is shown. A door 202 may be coupled to a shaft or rotating mechanism 204 and roll onto or unroll from (as described elsewhere herein) the rotating mechanism 204 as the door 202 is opened and/or closed. In an exemplary embodiment, a control station 206 may comprise a display 102, a controller 104, and/or ASD 106 (as described above).

Figure 3:
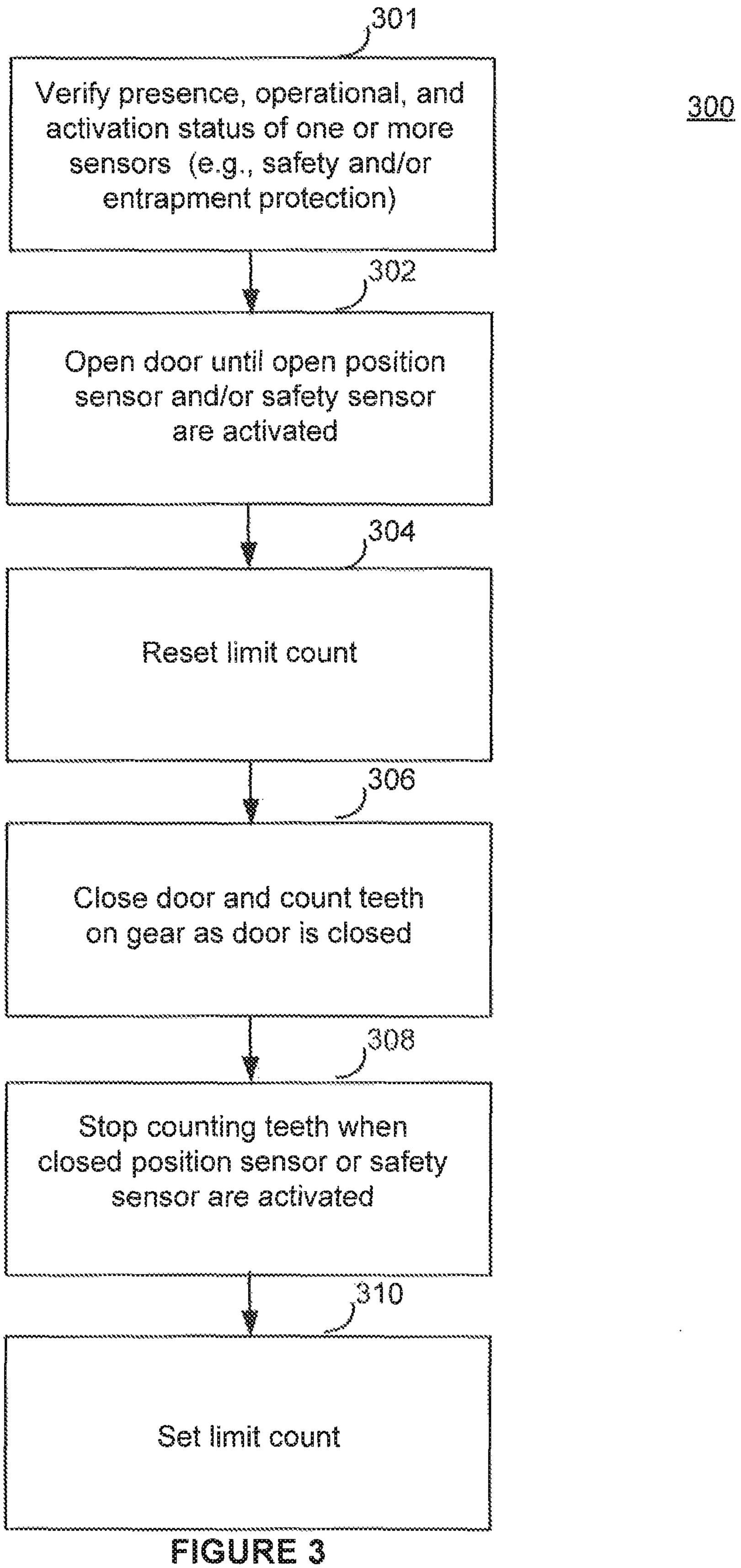
FIG. 3 shows a flowchart depicting an exemplary limit setting process.

In operation, and with reference now to FIGS. 2 and 3, a controller 104 may perform a limit setting operation. In various embodiments, a limit setting operation may be used to establish a distance a door should be allowed to travel during operation. That is, a limit may be set so that an operator 208 will not attempt to open or close a door 202 beyond a range of travel associated with the door (e.g., beyond rotating mechanism 204 if the door 202 is being opened and/or beyond a floor, base, or terminating surface if the door 202 is being closed).

A controller 104 may perform a limit setting operation in response to an input received from a display 102 (e.g., an input by a user to the display 102 to perform a limit setting operation). Thus, the present invention may enable a "one touch" limit setting operation. In various embodiments, a controller 104 may perform a limit setting operation automatically or absent user input. Thus, in various embodiments, the present invention may enable a "no touch" or "automatic" limit setting operation. The present invention may, in addition, enable a limit setting operation that is completed during a single half cycle (e.g., during a single opening or closing operation) of a door 202.

Now, as described briefly above, a limit may be set, or initialized, as follows. A controller may perform a check to verify the presence, operational status, and/or activation status of one or more position sensors, gear tooth sensors, entrapment protection sensors and/or detection (e.g., obstruction detection) devices and/or sensors (step 301). An open position sensor 210 may be disposed near or coupled to a portion of a door 202 and/or a door frame and may indicate, on detection of a target (such as an upper portion of a door 202), that the door 202 has reached an open position (step 302). In various embodiments, a position sensor comprising a safety or contact sensor, as described above, may detect that a door has reached an open position. A controller 104 may receive a signal communicated by the open position sensor 210 and/or safety or contact sensor indicating that the target portion of the door 202 has been detected (and/or that a door has reached an open position), and the controller 104 may, in response, clear or reset a "limit count" (step 304).

As described above, a "limit count" may comprise a number of gear teeth that a gear tooth sensor 214 must count, for example, to complete a half cycle. Having cleared the limit count, a controller 104 may further close, or initiate closing of, a door 202 (step 306). As a door 202 is closed, a gear tooth sensor 214 may sense or detect the passage or proximity of each of a plurality of gear teeth. As each gear tooth is sensed by the gear tooth sensor 214, the sensor 214 may communicate this data (e.g., as a signal) to a controller 104, which may count or tally the number of gear teeth that the sensor 214 senses (step 306). For instance, a controller 104 may increment a limit count by one each time the controller 104 receives a signal from a gear tooth sensor 214 indicating that a gear tooth has been detected. The controller 104 may stop counting or tallying gear teeth in response to detection of a target by a closed position sensor 212, which may likewise communicate a signal indicating that it has detected a closed target to the controller 104 (step 308). In various embodiments, a controller 104 may stop counting gear teeth in response to activation of a position sensor comprising a safety or contact sensor. The number of gear teeth counted by the controller 104 between the time the limit count is cleared (step 304) and the time one or both of the closed position sensor 212 and/or safety sensor are triggered may be stored, in various embodiments, by the controller 104 (e.g., in a memory coupled to the controller 104) as a new limit count (step 310). This new limit count may comprise a number of teeth that a gear tooth sensor 214 should sense during a typical half cycle of a door 202.

In various embodiments, a limit count may be set while a door 202 is being opened (as opposed to closed). This only requires that a limit count be reset in response to detection by a closed position sensor 212 of a target portion of a door 202 (as opposed to in response to detection by an open position sensor 210 of a target portion of a door 202) and/or activation of a safety or contact sensor, and the process depicted in FIG. 3 generally followed from this point as shown (with the exception that teeth are counted by a gear tooth sensor 214 as the door 202 is opened).

Figure 9:
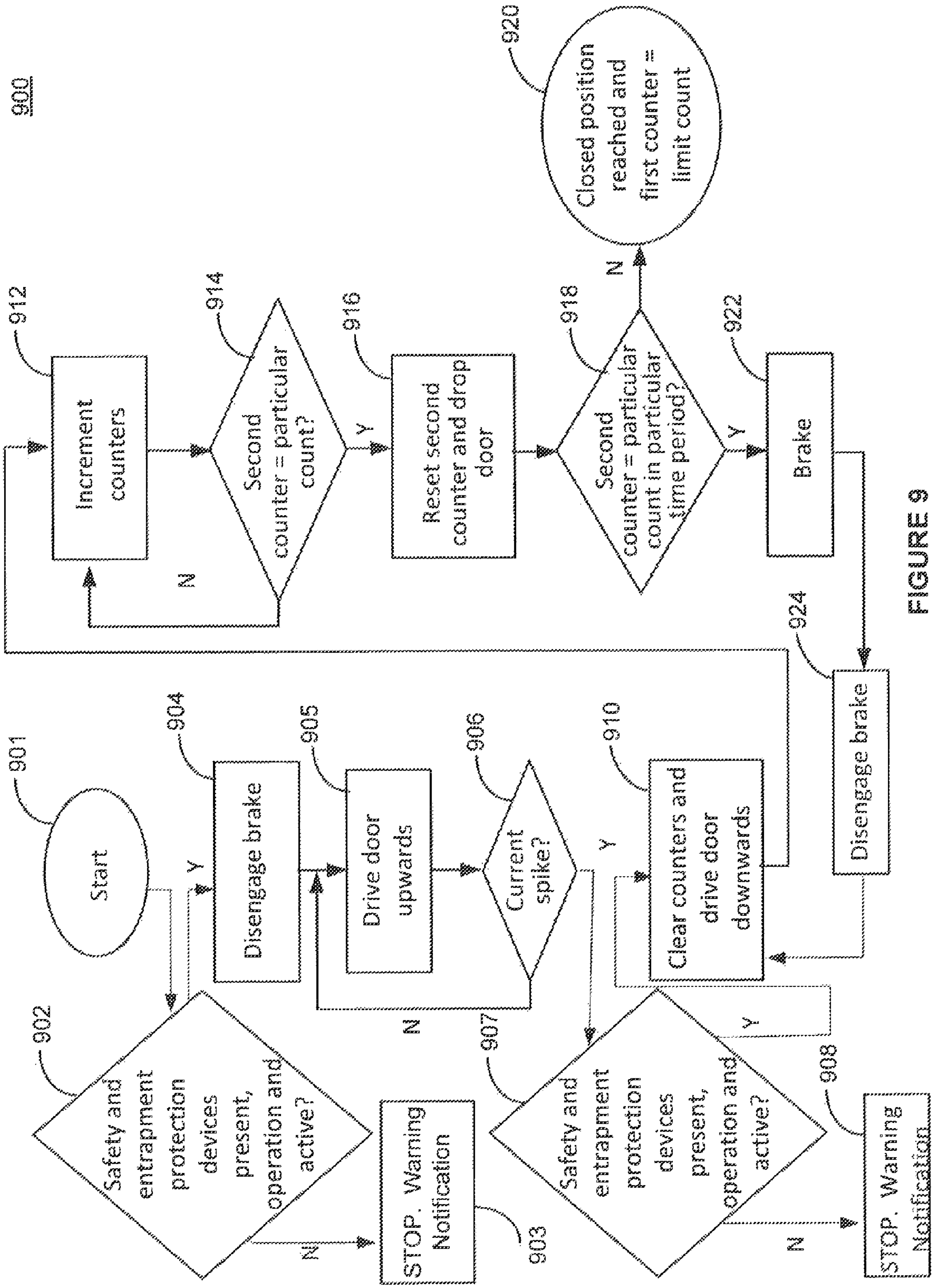
FIG. 9 shows a flowchart depicting an exemplary process for setting and/or resetting a limit in which position sensors may be omitted.

With reference to FIG. 9, a limit count may be set, in various embodiments, without the use of one or more position sensors. For instance, in certain embodiments, a door may start in an open (e.g., a partially open or fully open position) (step 901). Thereupon, in various embodiments, a controller may perform a check to verify the presence, operational status, and/or activation status of one or more position sensors, gear tooth sensors, entrapment protection sensors and/or detection (e.g., obstruction detection) devices and/or sensors (step 902). If any of these sensors are not present, not operational, and/or not otherwise active, a controller may terminate or stop a limit setting process and/or issue a warning notification (e.g., via a display) (step 903).

In response to a determination that all or a selected number of sensors are present, operational, and/or active, a limit count may be set by disengaging a brake (e.g., a brake comprising an operator 208, as described elsewhere herein) (step 904), which may permit the door 202 to begin to close (e.g., descend or drop). In response to disengagement of the brake, a controller 104 may instruct and/or cause an operator 208 to drive a door 202 towards an open position (step 905). In various embodiments, a door 202 may be driven towards an open position at a variety of speeds. For instance, in certain embodiments, a door 202 may be driven towards an open position by an ASD 106 comprising a VFD operating at thirty Hertz. The door 202 may be driven towards an open position by the ASD 106 until a current and/or voltage spike or drop is detected (e.g., by the ASD 106 and/or controller 104) in the ASD 106, indicating that the door has reached a maximum open position and/or cannot be opened or retracted any further (step 906).

In response to detecting a current spike and/or drop, and in various embodiments, a controller may perform a check to verify the presence, operational status, and/or activation status of one or more position sensors, gear tooth sensors, entrapment protection sensors and/or detection (e.g., obstruction detection) devices and/or sensors (step 907). If any of these sensors are not present, not operational, and/or not otherwise active, a controller may terminate or stop a limit setting process and/or issue a warning notification (e.g., via a display) (step 908).

However, in various embodiments and in response to a determination that all or a number of these sensors are present, operational, and/or active, a first counter and a second counter may be cleared and a door 202 driven by an ASD 106 from an open position towards a closed position (e.g., downwards) (step 910). In various embodiments, a controller 104 may provide a first and/or second counter. A door 202 may be driven towards a closed position at a variety of speeds; however, as described above, where an ASD 106 comprises a VFD, a door 202 may be driven towards a closed position at a relatively low speed, e.g., by an ASD operating at five Hertz. As a door 202 is driven towards a closed position, the first and second counters may begin to record or count, as described elsewhere herein, a number of gear teeth (step 912). A door 202 may be driven towards a closed position until a counter, e.g., the second counter, equals a particular count or tally (step 914). For instance, in various embodiments, a door 202 may be driven towards a closed position by a distance that is relatively small in comparison to the total distance the door 202 may travel between a fully open and a fully closed position. Such a distance may comprise, in certain embodiments, a distance corresponding to three pulses of a gear tooth sensor and/or a count of three in the second counter.

As a second counter reaches a particular count, the second counter may be reset (e.g., to a count of zero), and a door 202 once more allowed to close or extend unimpeded by a brake or braking mechanism (step 916). As the door 202 closes, the first counter may be incremented in accordance with a total number of gear teeth sensed by a gear tooth sensor (e.g., so that the first counter is not reset, but continues to count from step 910), while the second counter may be allowed to rise again to a particular count, e.g., a count of three, if it is able to do so within a particular period of time (e.g., five seconds) (step 918). If the second counter does not reach the particular count within the particular period of time, this may indicate that the door 202 has reached an extended or closed position (step 920). Where this is the case, the first count may comprise a limit count, as described above. If, on the other hand, the second counter reaches the particular count within the particular period of time, this may indicate that the door 202 has not reached an extended or closed position, in which case, a brake or braking mechanism may be applied to halt or slow the progress of the door 202 (step 922). A brake or braking mechanism may be further disengaged (step 924) and the limit setting/resetting process repeated from step 910.

Thus, a limit count may be set and/or reset without the assistance of one or more position sensors. Further, although the process described above sets and/or resets a limit count using a first counter and a second counter, in various embodiments, mechanical and/or logical changes may be made without departing from the scope and spirit of this disclosure. For instance, in certain embodiments, a second counter may be excluded from the system and a first counter incremented from an open position (e.g., as described with regard to step 908) until a position sensor located near a closed door position is triggered (e.g., by contact with a door 202). Similarly, in various embodiments, a second counter may not be repeatedly cleared or reset (e.g., as described with reference to step 916), but incremented according to a particular count as described above. Further still, in various embodiments, a door 202 may not be extended or allowed to close freely, as described above, but driven towards a closed position until a position sensor is activated or triggered. In addition, in some embodiments, a door 202 may only be extended or allowed to close freely in braked increments (e.g., five second braked increments) until the door 202 reaches a position sensor and/or until a second counter fails to reach a particular count during a particular braked increment, as described above.

Figure 4:
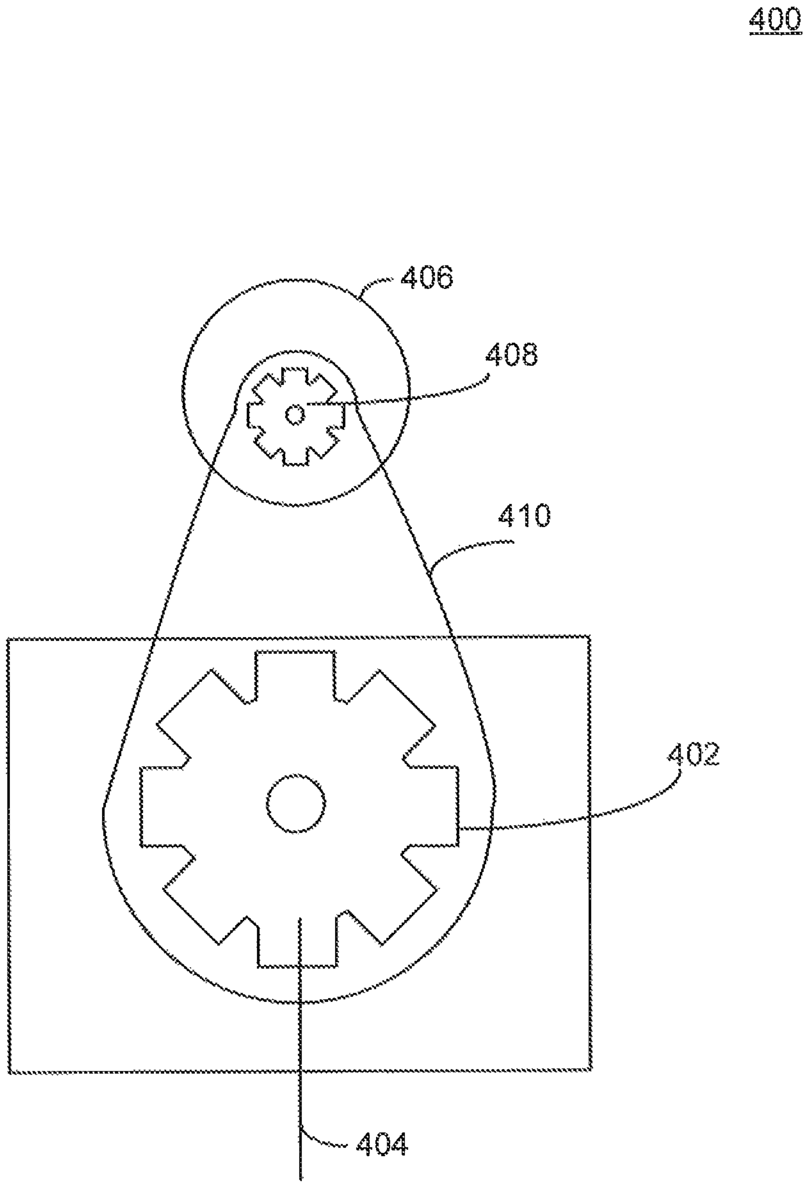
FIG. 4 shows a system diagram depicting an exemplary drive mechanism coupled to a gear tooth sensor.

With momentary reference to FIG. 4, an exemplary drive mechanism 400 is shown (magnetically) coupled to a gear tooth sensor 404. As shown, a mechanism gear 402 may be coupled to an operator gear 408 directly and/or via a chain or belt 410. Operator gear 408 may be coupled to the output of an operator 406, while mechanism gear 402 may be coupled to a rotating mechanism 204. As the operator 406 turns the operator gear 408, operator gear 408 may turn chain 410, which may turn mechanism gear 402. Thus, operator 406 may turn a rotating mechanism 204 by way of a drive mechanism 400. A gear tooth sensor 404 may be disposed over a portion of mechanism gear 402 and/or operator gear 408 and so detect the passage or proximity of each passing gear tooth as one or both of gears 402 and/or 408 rotate.

Having set or initialized a limit count, a controller 104 may proceed to a normal mode of operation in which the controller 104 may open and/or close a door based upon the limit count.

For example, during normal operation, a controller 104 may receive a signal from a gear tooth sensor 214 indicating that the sensor 214 has detected a gear tooth. The controller may keep a count or tally of the number of gear teeth detected by the sensor 214, and this count may comprise, as described above, a "measured count." In various embodiments, a controller 104 may disengage or stop an operator 208 based upon a comparison of the limit count to the measured count. For instance, a controller 104 may stop an operator 208 when a measured count equals a limit count. A controller 104 may, in a variety of embodiments, stop an operator 208 when an open and/or closed position sensor 210 and/or 212, respectively, are activated or triggered.

Figure 5:
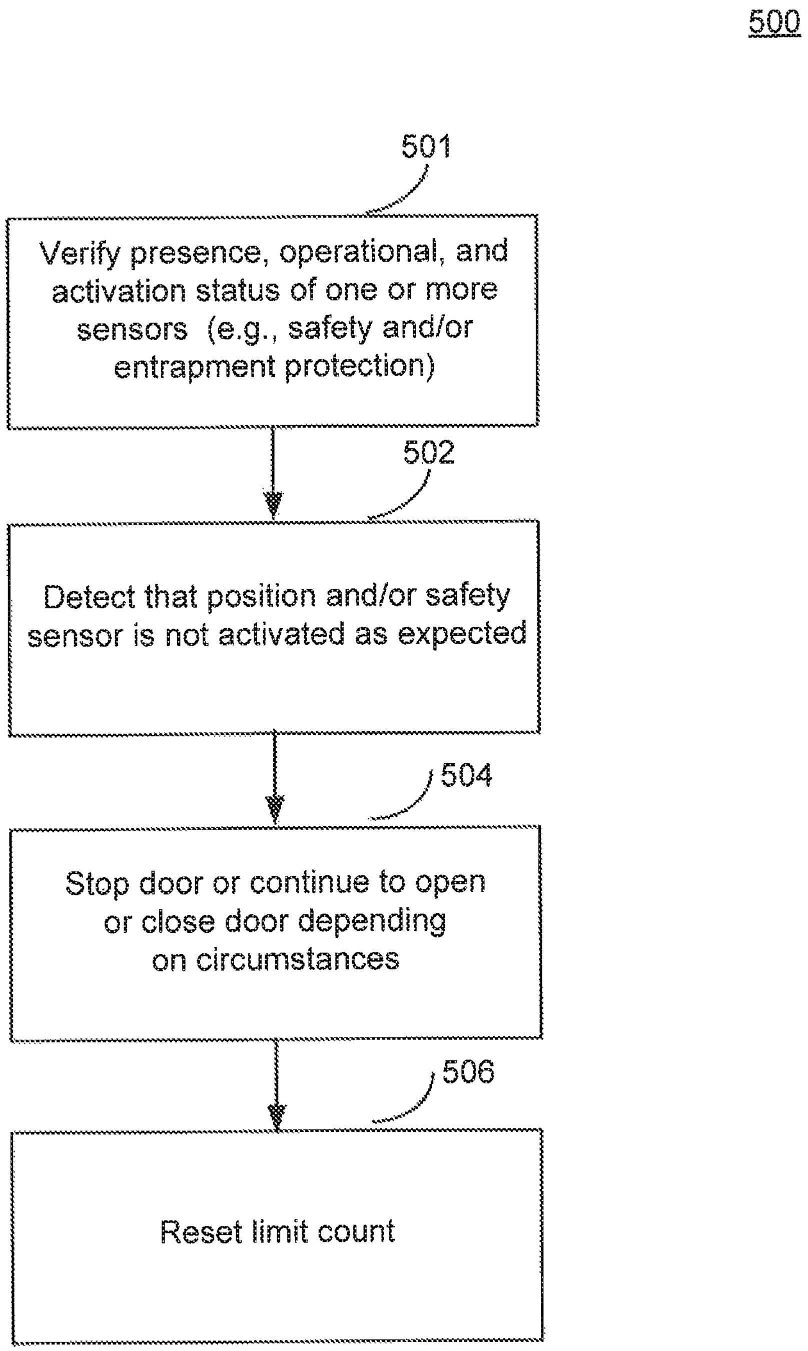
FIG. 5 shows a flowchart depicting an exemplary process for resetting a limit.

In various embodiments, and referring now to FIG. 5, a controller 104 may reset a limit count. For example, in various embodiments, a controller 104 may perform a check to verify the presence, operational status, and/or activation status of one or more position sensors, gear tooth sensors, entrapment protection sensors and/or detection (e.g., obstruction detection) devices and/or sensors (step 501). Further, a controller 104 may determine that a position sensor is not triggered or activated when a measured count equals a limit count or, on the other hand, that a position sensor is triggered or activated when a measured count is less than a limit count (step 502). This may occur, for example, as a result of physical wear on a door curtain (e.g., a curtain may shorten or lengthen over time). In various embodiments, a controller 104 may cause a door operator 208 to continue to open or close a door curtain or panel, even though a position sensor is not activated or triggered as expected (e.g., when a measured count equals a limit count and because the collected data suggest that the door has contracted) (step 504). A controller 104 may further cause an operator 208 to stop in response to detection of a position sensor (e.g., before a measured count equals a limit count and because the collected data suggest that the door has lengthened). In various embodiments, a controller 104 may further clear or delete a stored limit count (steps 504 and 506). Where a controller 104 clears or deletes an incorrect or outdated limit count, the controller 104 may reset the limit count as described above (step 506). Thus, the present invention may automatically, and over time, adjust a limit count for wear on a door curtain as well as compensate for inaccurate and/or outdated and/or faulty limit counts (e.g., by inferring wear on a door curtain based upon a comparison of the measured count to the limit count and/or a position sensor signal).

In various embodiments, a controller 104 may enable soft starts and/or soft stops. For example, a controller 104 may control an ASD 106 to adjust an output power supplied by the ASD 106 to an operator 208. More particularly, an ASD 106 may supply an increasing and/or decreasing output power to an operator 208 based upon a state (e.g., stationary, non-stationary, nearing a stationary position, leaving a stationary position, etc.) of the door 202. For example, an ASD 106 may deliver an increasing output power to an operator 208 as a door 202 begins to travel from a stationary position (e.g., as a door 202 is moved from a particular position). Likewise, in various embodiments, ASD 106 may supply a decreasing output power to an operator 208 as a door 202 nears a destination position or transitions to a stationary position (e.g., as a door 202 begins to reach a stopping position).

Further, and in various embodiments, a controller 104 may enable a variable door speed. For example, a controller 104 may control an ASD 106, much as described above with reference to soft starts and/or soft stops, to vary the power supplied to an operator 108. An output power of an ASD 106 may be varied based, for example, upon a state and/or position associated with a door. For instance, as a door 202 starts from a stationary position, a controller 104 may control an ASD 106 to increase or ramp up (incrementally and/or smoothly) the power supplied to an operator 108. Thus, an operator 108 may gradually increase the speed with which a door 202 is opened and/or closed during the course of its progress. Similarly, as a door 202 nears or comes nearer a destination position, a controller 104 may instruct an ASD 106 to decrease or ramp down (again, incrementally and/or smoothly) the power supplied to an operator 108. Thus, an operator 108 may gradually decrease the speed with which a door 202 is opened and/or closed during the course of its progress as well.

Figure 6A:
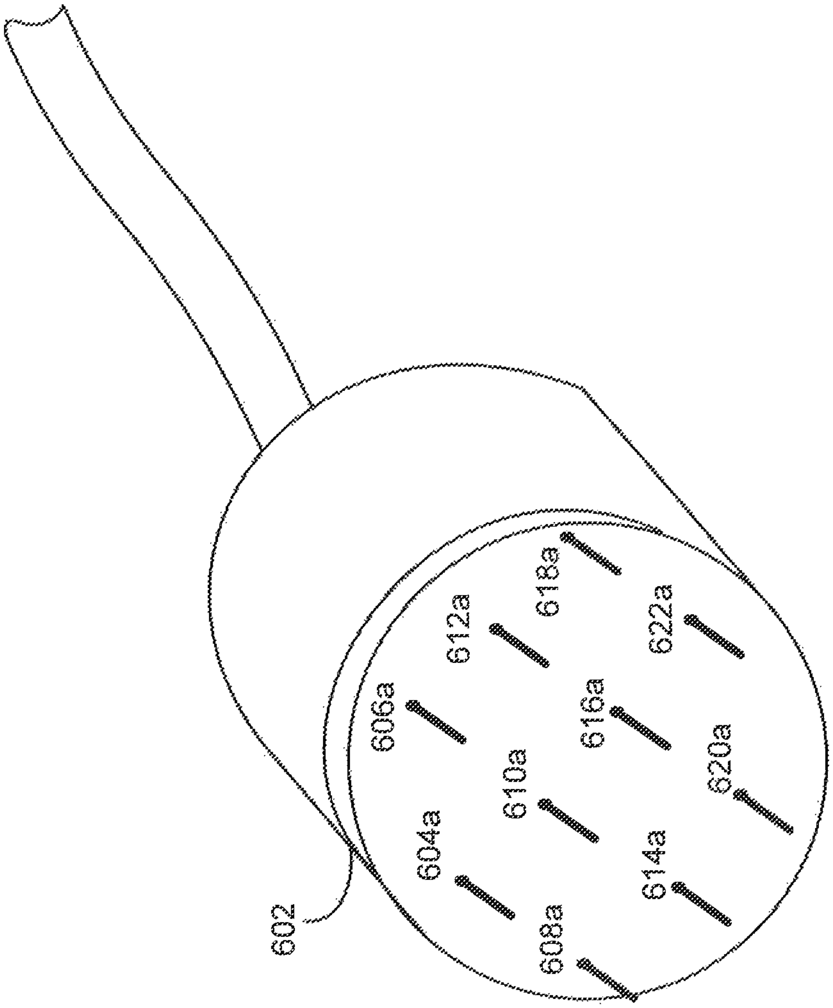
FIG. 6A shows a system diagram depicting an exemplary operator plug.
Figure 6B:
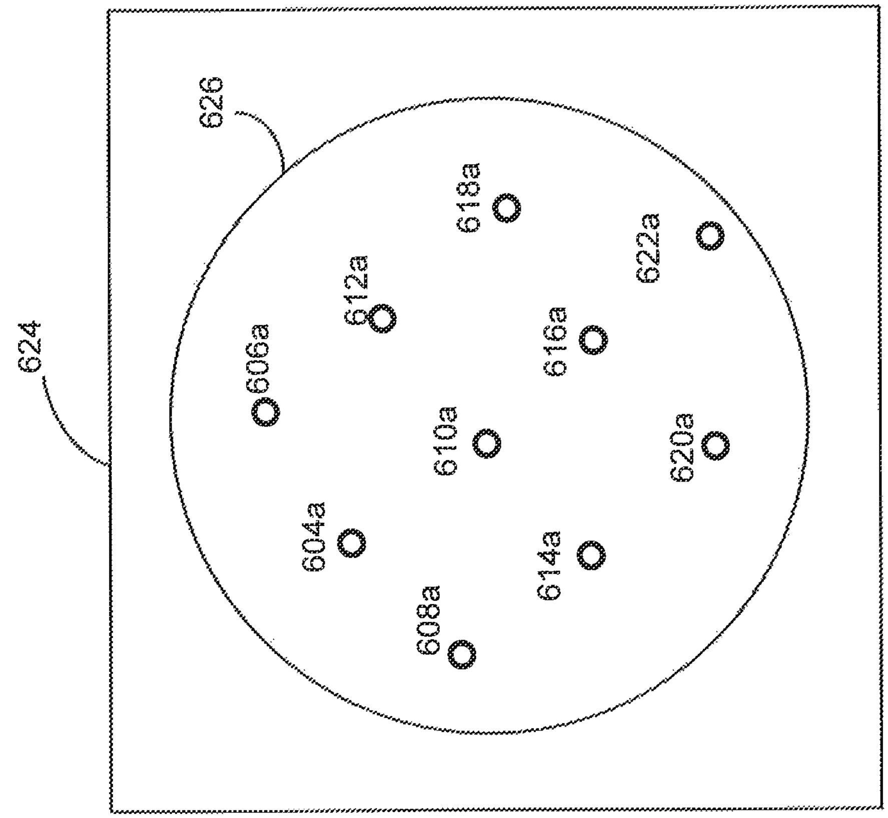
FIG. 6B shows a system diagram depicting an exemplary adjustable speed drive socket.

With reference now to FIGS. 6A and 6B, in certain embodiments, a door control system 100 may include a "plug and play" feature. A plug and play feature may, for example, enable interoperation between a controller 104 and/or an ASD 106 and a variety of brands and/or models of operator 108.

With particular regard to FIG. 6A, a plug 602 associated with an operator 108 is shown. The plug 602 may comprise a plurality of pins 604*a*-622*a*, each of which may be assigned a particular input and/or output (e.g., stop, open, close, raise, lower, error, ground, etc.) With reference to FIG. 6B, a port 626 associated with an ASD 624 is shown. As the plug 602 comprises a plurality of pins 604*a*-622*a*, so the port 626 comprises a plurality of sockets 604*b*-622*b*, each assigned a particular input and/or output.

In general, for operator 108 to communicate with an ASD 624, the inputs and outputs of pins 604*a*-622*a* must correspond to the inputs and outputs of sockets 604*b*-622*b*. That is, an ASD 624 may be programmed to receive an error signal on a particular socket (e.g., socket 604*b*). To communicate with ASD 624, an operator 108 must therefore output any error signal that it generates to a corresponding pin (e.g., pin 604*a*); otherwise, the ASD 624 may not properly interpret output signals received from the operator 108. Similarly, where an operator 108 is programmed to receive a particular input signal on a particular pin 604*a*-622*a*, an ASD 624 must provide this signal on a correct socket 604*b*-622*b*, or the operator 108 may not properly interpret the signal. Further, in various embodiments, an ASD 624 may comprise pins (as opposed to sockets), while a plug 602 may comprise sockets (as opposed to pins).

A plug and play feature may therefore be enabled by ASD 624, where, for example, an operator 108 manufacturer is provided with a map that shows the pins (and/or sockets) to which various input and/or output signals are properly applied in ASD 624. One or more operator 108 manufacturers may, based on the map, provide or manufacture a plug 602 that is interoperable with ASD 624. In other words, an operator 108 manufacturer may provide a plug 602 having pins 604*a*-622*a* that correspond to sockets 604*b*-622*b* in ASD 624. Thus, the present invention may provide a plug and play feature, whereby a door control system 100 (e.g., an ASD 624) may be coupled quickly and on the fly to a plurality of different operators 108. This may be accomplished, as described above, simply by connecting a plug 602 associated with a desired operator 108 to an ASD 624 and/or a controller 104. An ASD 624 may therefore control a variety of operators 108, provided each operator 108 is equipped with a plug that corresponds to the input and/or output signals that ASD 624 is programmed to receive on each of its pins (and/or sockets) 604*b*-622*b*.

As described more briefly above, any of the components comprising a door control system 100 (e.g., a display 102, a controller 104, an ASD 106, and operator 108, and/or a sensor 110-114) may be coupled to a network 116 and may communicate, via the network 116, with a distributor system 118. A distributor system 118 may communicate or transmit data or functionality to any of these system components. For example, in an exemplary embodiment, a distributor system 118 may communicate or "push" updated and/or new functionality (e.g., new or updated software) to a controller 104 and/or a display 102. A distributor system 118 may further activate disabled functionality and/or deactivate enabled functionality in a controller 104 and/or a display 102, and this may be accomplished by sending a command from the distributor system 118 to the controller 104 and/or the display 102 that instructs the controller 104 and/or display 102 to enable or disable particular functionality.

Moreover, in various embodiments, distributor system 118 may activate disabled functionality and/or push new and/or updated functionality in response to a request from a system component for new and/or updated functionality. For example, a display 102 and/or a controller 104 may transmit or communicate a purchase request to a distributor system 118 as part of or in addition to a request for new and/or updated functionality. A distributor system 118 may also bill a user associated with a door control system 100 in response to a request for new and/or updated functionality. Thus, a system component such as a controller 104 and/or a display 102 may be updated and/or upgraded (e.g., with new functionality) by way of a network connection with a distributor system 118.

A controller 104 may further include self-monitoring and/or system monitoring functionality. For example, in various embodiments, a controller 104 may include software and/or hardware for monitoring its own operational status and/or the operational status of any component to which it may be communicatively coupled (e.g., an operator 208, a display 102, an ASD 106, one or more sensors 110, 112, and/or 114, and/or a door 202). A controller 104 may, similarly, include hardware and/or software for diagnosing problems and/or troubleshooting problems associated therewith and/or components to which it may be coupled. A controller 104 may generate diagnostic information, such as a message and/or an alert (e.g., a "fault message" or a "status message") in response to (or as a result of or based on), e.g., monitoring an operational status, diagnosing a problem, troubleshooting a problem, etc.

A controller 104 may also, in one or more embodiments, include redundant logic and/or functionality. For example, a controller 104 may include a first memory comprising a first, or primary, set of logic and/or functionality as well as a second or backup memory comprising a secondary, or backup, set of logic and/or functionality. A controller 104 may, in response to a self-monitoring process, switch to a backup logic and/or functionality. More particularly, and for example, a controller 104 may switch to a backup logic and/or functionality in response to a determination, by the controller, that there may be a problem with the first set of logic and/or functionality.

In certain embodiments, a controller 104 may monitor a progress or state associated with a door 202 as it travels in a particular direction. For example, a controller 104 may monitor and/or calculate, as a function of a total distance a door 202 may travel, a relative position of the door 202. More particularly, a controller 104 may calculate, for example, a percentage that a door is open and/or a percentage that a door is closed. A controller 104 may calculate a door position and/or a percentage associated with a door position based upon, for example, a comparison of a measured count to a limit count (as described above) and/or information about a direction the door 202 is traveling (e.g., whether the door 202 is opening or closing). Thus, for example, and for purposes of illustration, a controller 104 may calculate that a door is 50% open where the controller 104 receives a command (e.g., from a user) and/or issues a command (e.g., to an ASD 106) to open the door 202, as well as where a measured count divided by a limit count equals 0.5 (or approximately equals 0.5). Thus, a controller 104 may calculate a relative door position based upon a comparison (e.g., a quotient) between a measured count to a limit count.

Further, in various embodiments, a controller 104 may communicate diagnostic and/or status information (e.g., a message and/or an alert, as described elsewhere herein and/or information gleaned as described above with reference to the self-monitoring functionality) to a distributor system 118 and/or to a display 102. Where the information is transmitted to a distributor system (e.g., as an alert) 118, in response to receiving this information, the distributor system 118 may, and, in certain embodiments and without the physical assistance of a party with physical access to a door control system 100, verify the identity of a user requesting service and/or remotely troubleshoot the door control system 100. For example, a distributor system 118 may route diagnostic and/or status information to a customer service agent and/or to an automated troubleshooting system. In either event, the agent and/or the automated troubleshooting system may remotely diagnose a problem or condition associated with a door control system 100 (e.g., that one of a sensor 110, 112, and/or 114 is defective and/or has encountered a problem, that an ASD 106 should be has encountered a problem, that a network 116 connection has encountered a problem and/or should be reset, etc.) and/or remotely access a controller 104 to ameliorate and/or attempt to remotely ameliorate the problem or condition. Where a customer service agent and/or an automated troubleshooting system and/or process are unable to resolve a problem, a distributor system 118 may generate a factory reset memory module (e.g., a factory reset secure digital, or "SD" card), which a user may physically install in a door control system 100.

Further still, in various embodiments, a controller 104 may include hardware and/or software to schedule service or maintenance with a distributor system 118. Maintenance may be scheduled according to a predefined schedule and/or, as described above, in response to detection or a diagnosis of a problem or condition. In addition, maintenance may be scheduled by a controller 104 in response to a maintenance request, which may be made, for example, by a user via a display 102. Further, maintenance may be scheduled automatically with a distributor system 118, and/or a controller 104 may output a maintenance request to a display 102, which a user may accept, modify, and/or decline. In certain embodiments, e.g., where a user chooses to accept and/or modify a maintenance request, a user may be presented with a calendar (e.g., via a display 102), from which the user may select or schedule a date for the maintenance request. Further, in various embodiments, maintenance and/or troubleshooting operations may be performed (e.g., by a distributor system 118) in response to detection by a controller 104 of a problem or condition (as described elsewhere herein).

In various embodiments, a display 102 may show or present a variety of information associated with a door 202. For example, a display 102 may show a variety of diagnostic information (as described elsewhere herein) for review by a user. More particularly, a display 102 may show an operational status, information associated with a (e.g., diagnosed) problem, troubleshooting information, and the like. A display may further illustrate a progress associated with a door as it travels in a particular direction (as described above). For example, a display 102 may show an animation depicting, in real time, the progress of a door 202 as it travels in a particular direction. This may be accomplished as described above, and a display may, in addition, show a percentage associated with the progress of a door 202 (also as described above).

Further, and as described elsewhere herein, a display may comprise a GUI. In various embodiments, a GUI may display a variety of "soft" or software based (e.g., visual) buttons or options. A user may interact with a GUI to select a variety of options. In various embodiments, exemplary options may include options to set and/or reset a limit, options to open, close, and/or stop a door, options to display visual diagnostic information, options to order or request maintenance, and the like. In an exemplary embodiment, a user may interact with a visual depiction of a door 202 displayed by a GUI to provide instructions to a controller 104 for controlling an operation of the door. For instance, a user may touch a portion of a display 102 in which a top portion of a door is displayed. A controller 104 may receive this data from a display 102 (e.g., where the display 102 comprises a touch screen display, as described above), and, based upon its programming, instruct an operator 208 to open the door 202. Thus, depending upon an option selected, a display 102 may communicate with a controller 104, a distributor system 118, and the like to provide additional detail and/or to relay a user's request and/or command to an appropriate device and/or system. A display 102 may therefore provide an interactive and intuitive visual aid to users, whereby users may interact with a door control system 100.

A door control system 100 may further comprise an unshared (or standalone) system and/or a shared system. In various embodiments, an unshared system may comprise a controller 104 coupled to a single operator 208 (as described above and as depicted generally at FIGS. 1 and 2). Thus, an unshared system may comprise a door control system 100 in which a one-to-one relationship exists between a controller 104 and an operator 208.

Figure 7A:
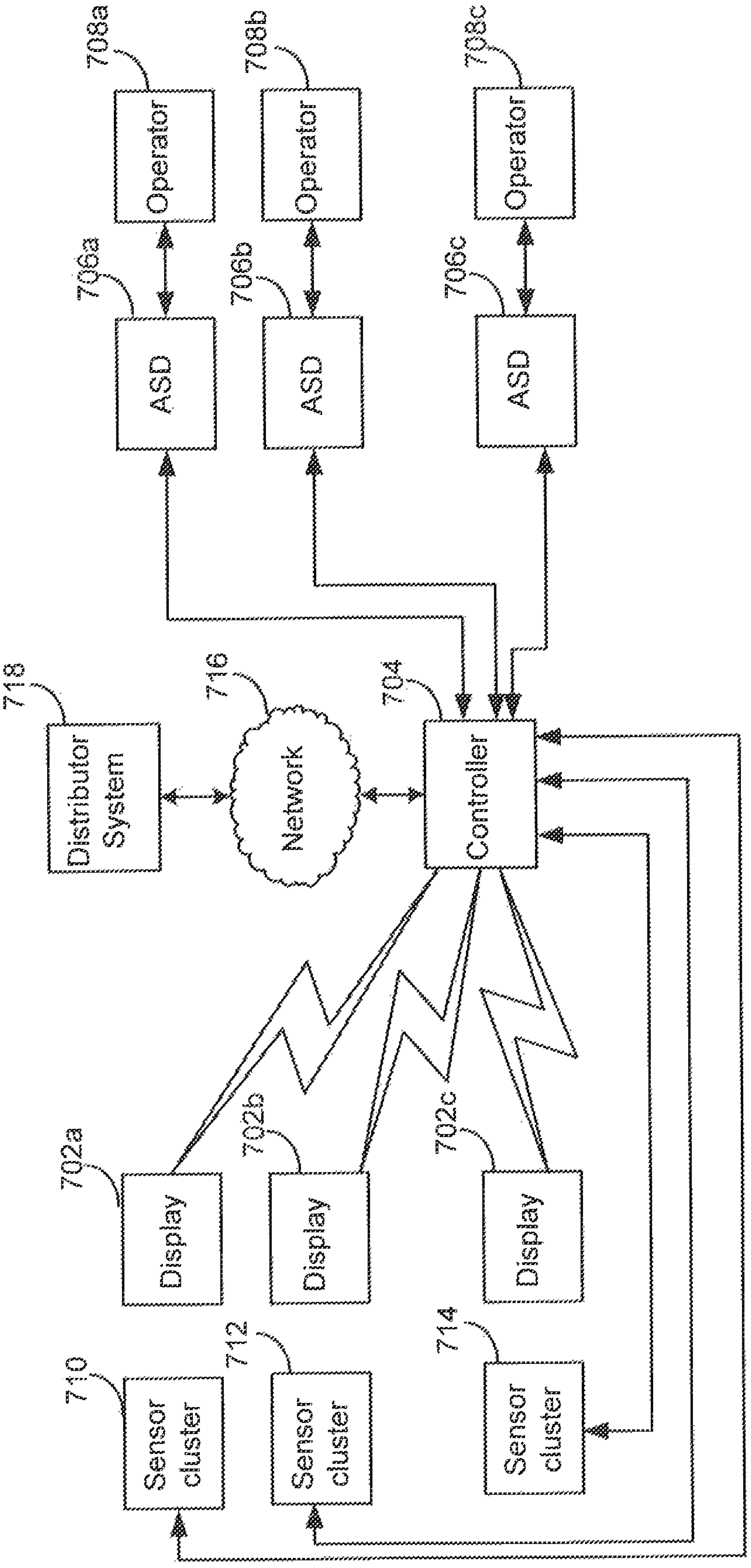
FIG. 7A shows a block diagram of an exemplary shared distributed door control system.
Figure 7B:
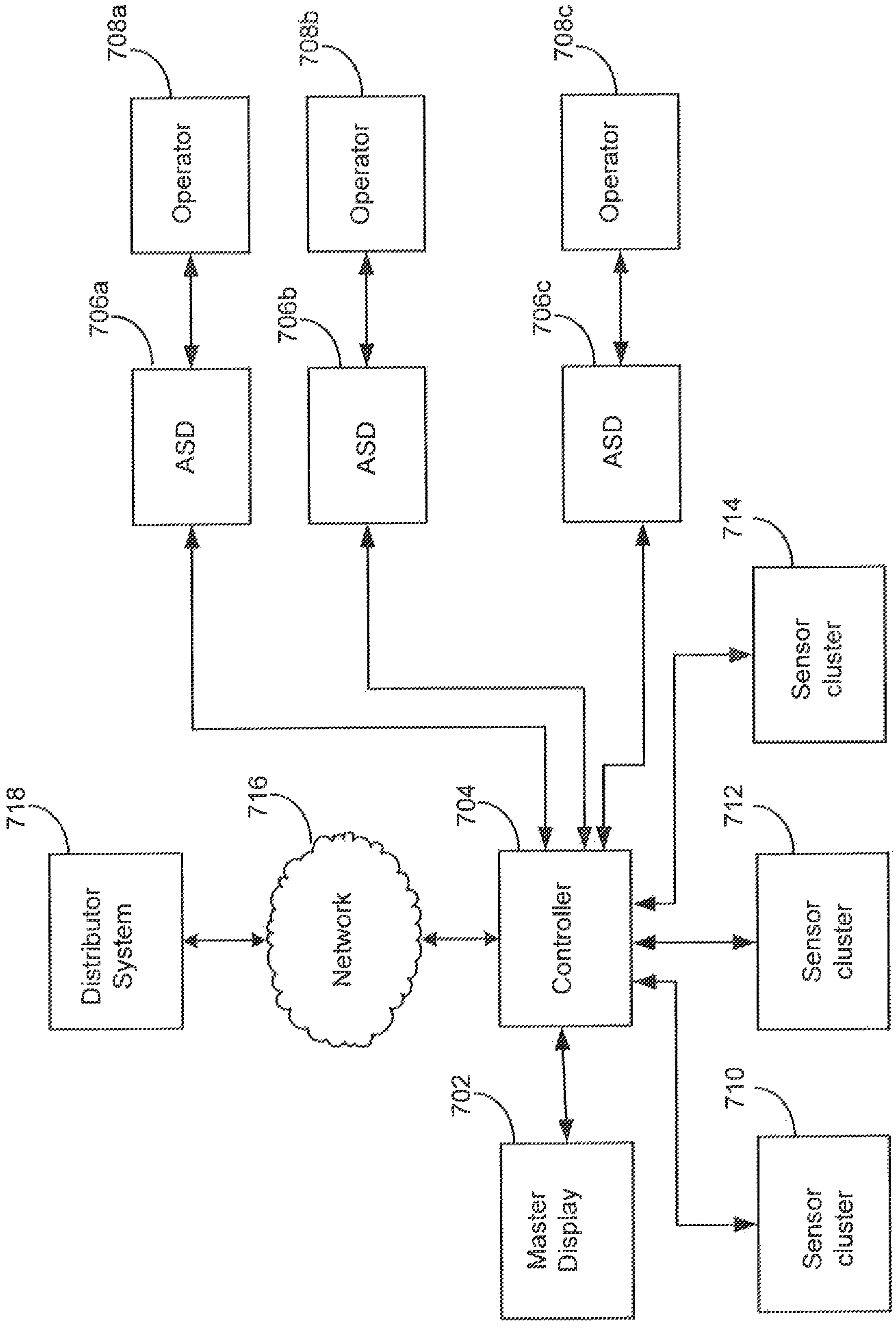
FIG. 7B shows a block diagram of an exemplary consolidated door control system in which a master display is coupled to a controller.
Figure 7C:
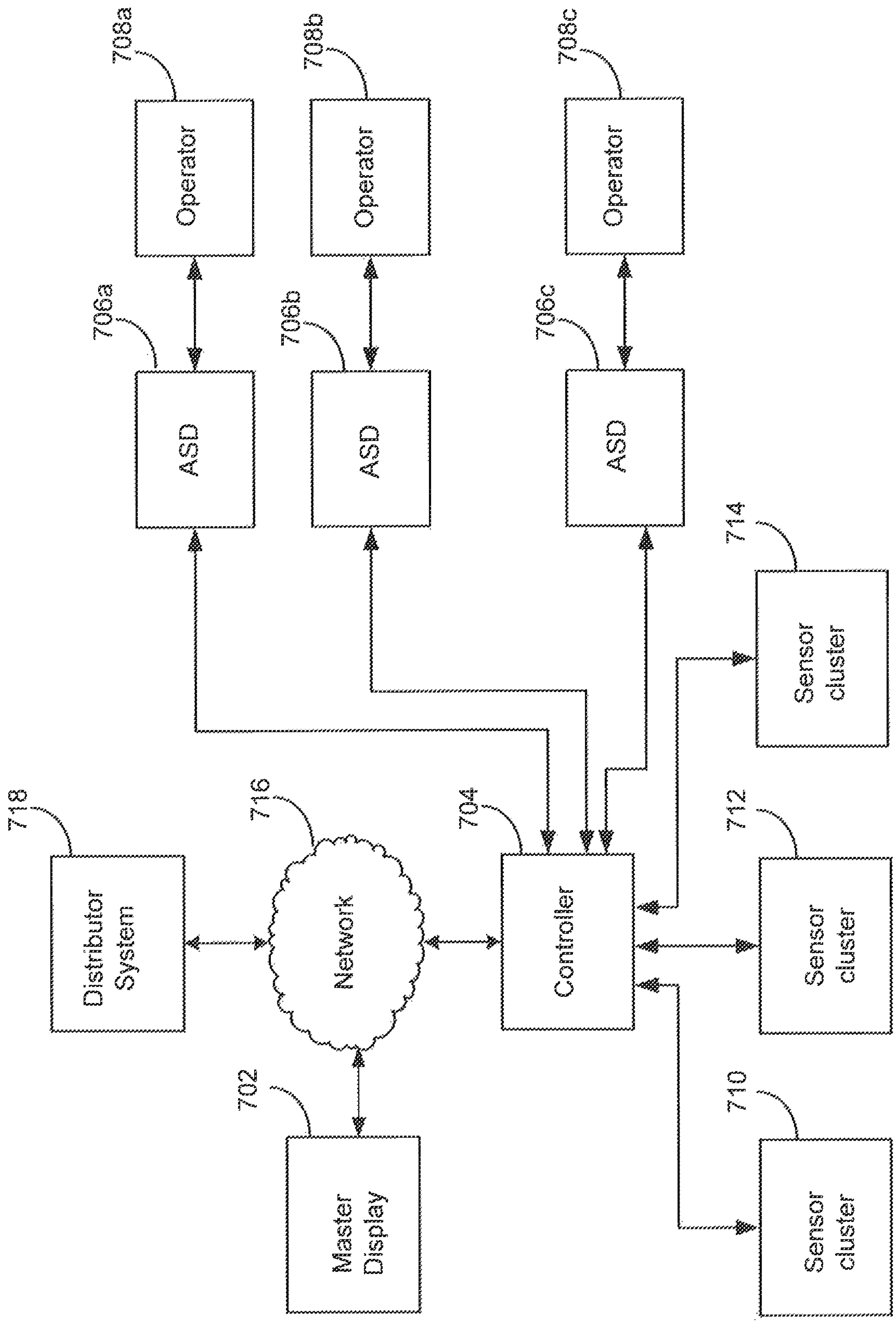
FIG. 7C shows a block diagram of an exemplary consolidated door control system in which a master display is coupled to a network.

With reference now to FIGS. 7A, 7B, and 7C, in various embodiments, a shared system may comprise a shared distributed system 700*a* and/or a shared consolidated system 700*b* and/or 700*c*. Both of a shared distributed system 700*a* and a shared consolidated system 700*b* and/or 700*c* may be installed in a building comprising a plurality of doors (e.g., a warehouse or receiving bay). Installation of systems 700*a*, 700*b*, and/or 700*c* may enable automation of all or a portion of the doors in a particular building. For example, as described below, installation of a system 700*b* and/or 700*c* in a building may allow a user to control a plurality of doors with the assistance of a single controller 704 and/or from a single master display 702.

Thus, in various embodiments, both of a shared distributed system 700*a* and a shared consolidated system 700*b* and/or 700*c* may comprise a controller 704, a plurality of ASDs, e.g., ASDs 706*a*, 706*b*, and 706*c*, a plurality of operators, e.g., operators 708*a*, 708*b*, and 708*c*, a plurality of sensor clusters, e.g., sensor clusters 710, 712, and 714, a network 716, and/or a distributor system 718. Each of these components and/or systems may operate, in general, as described above. Sensor clusters 710-714 may, however, comprise a cluster or group of sensors. For instance, each of sensor clusters 710-714 may comprise one or more gear tooth sensors and/or one or more position sensors, as described more fully above. Moreover, a sensor cluster 710-714 may be associated with a particular door, also as described more fully above.

A shared distributed system 700*a* may differ from a shared consolidated system 700*b* and/or 700*c*, however, in that a shared distributed system 700*a* may comprise a plurality of displays, e.g., displays 702*a*, 702*b*, and 702*c*. In an exemplary embodiment, each display 702*a*-702*c* may be mounted in the vicinity of a particular door and/or coupled to a sensor cluster 710-714 for controlling the particular door. In contrast, a shared consolidated system 700*b* and/or 700*c* may comprise a single master display 702, which may be mounted away from a plurality of doors, but which may provide access to and information about, as described elsewhere herein, each of the doors to which it is coupled via a controller 704 and/or network 716. Thus, both of a shared distributed system 700*a* and a shared consolidated system 700*b* and/or 700*c* may provide access to and control over a plurality of ASDs 706*a*-706*c* and/or a plurality of operators 708*a*-708*c*. However, while a shared distributed system 700*a* may include a plurality of displays 702*a*-702*c* (e.g., one display for each door controlled by the system 700*a*), a shared consolidated system may include a single master display 702, which may provide access to and control over a plurality of doors. Further, in various embodiments, a shared consolidated system 700*b* and/or 700*c* may enable monitoring and/or surveillance of a building or structure in which the system 700*b* and/or 700*c* is installed. For example, a user may review information about a plurality of doors and/or door control systems from a master display 702, such as, for example, access and/or access attempts, door condition and/or status (e.g., open and/or closed, problem detected, etc.)

With continuing regard to systems 700*a*-700*c*, although FIGS. 7A, 7B, and 7C depict three ASDs 706*a*-706*c*, in certain embodiments, a single controller 704 may communicate with up to approximately one hundred and fifty ASDs. Similarly, while only three displays 702*a*-702*c* are shown in FIG. 7A, in various embodiments, a single controller 704 may communicate with up to approximately 256 displays.

Each of the components and/or systems comprising shared distributed system 700*a* and shared consolidated systems 700*b* and 700*c* may communicate, as described above, via a wired and/or wireless connection, as well as via one or more networks. For example, sensor clusters 710-714 may communicate with any of the components comprising systems 700*a* and/or 700*b* (e.g., a display 702*a*-702*c* and/or a controller 704), and these communications may occur wirelessly as well as over a wired connection.

Moreover, each of systems 700*a*, 700*b*, and 700*c* (as well as a standalone system, such as a door control system 100) may couple, as described above, to a distributor system, e.g., distributor system 718. Where a user is reluctant or unwilling to couple a door control system 100, 700*a*, 700*b*, and/or 700*c* to an existing or "legacy" network (e.g., the user's local area network or "LAN," which may couple through a firewall to the Internet), a door control system 100, 700*a*, 700*b*, 700*c* may communicate with a distributor system 118 via a cellular communications network (e.g., using GPRS). A SIM card installed in a controller 104 and/or 704 may facilitate cellular communications, and a distributor system may, in this way, communicate with a door system without the necessity of data transfer through the user's LAN.

In various embodiments, a user may lease a door system. A user may be interested in such an option where, for example, the user leases a building (e.g., a warehouse) that includes a variety of doors, one or more of which the user would like to couple to a door control system. In these circumstances, however, a user may have little interest in purchasing a door control system, as the user's desire for the system may be limited by the lease term (e.g., to a year or several years). Thus, a distributor and/or distributor system (e.g., a distributor system 118 and/or 718) may lease a door control system (e.g., 100, 700*a*, 700*b*, and/or 700*c*) to a user or purchaser for a term corresponding to the user's lease term. A distributor and/or distributor system may further offer for sale and/or lease a service package, as described above.

Where a user leases a door control system, a controller 104 may request and/or receive an authorization to operate, which may comprise an authorization by a distributor system 118 for the controller 104 to operate and/or for the controller 104 to control one or more displays 102, ASDs 106, operators 108, and the like. A controller 104 may receive an authorization to operate in specified intervals (e.g., once a day, once a month, once a year, etc.), and these intervals may, in some embodiments, be based upon a lease agreement and/or an expiration of a lease agreement (e.g., they may occur near the end of a particular lease term and/or near a payment due date). Further, a controller 104 may, in various embodiments, request an authorization to operate. Moreover, in certain embodiments, a controller 104 may receive an authorization to operate in response to a communication, by the controller 104, of a purchase request. Further still, in various embodiments, a lease agreement may include installation of and/or push updates for new features, scheduled maintenance, troubleshooting, and the like.

Figure 8:
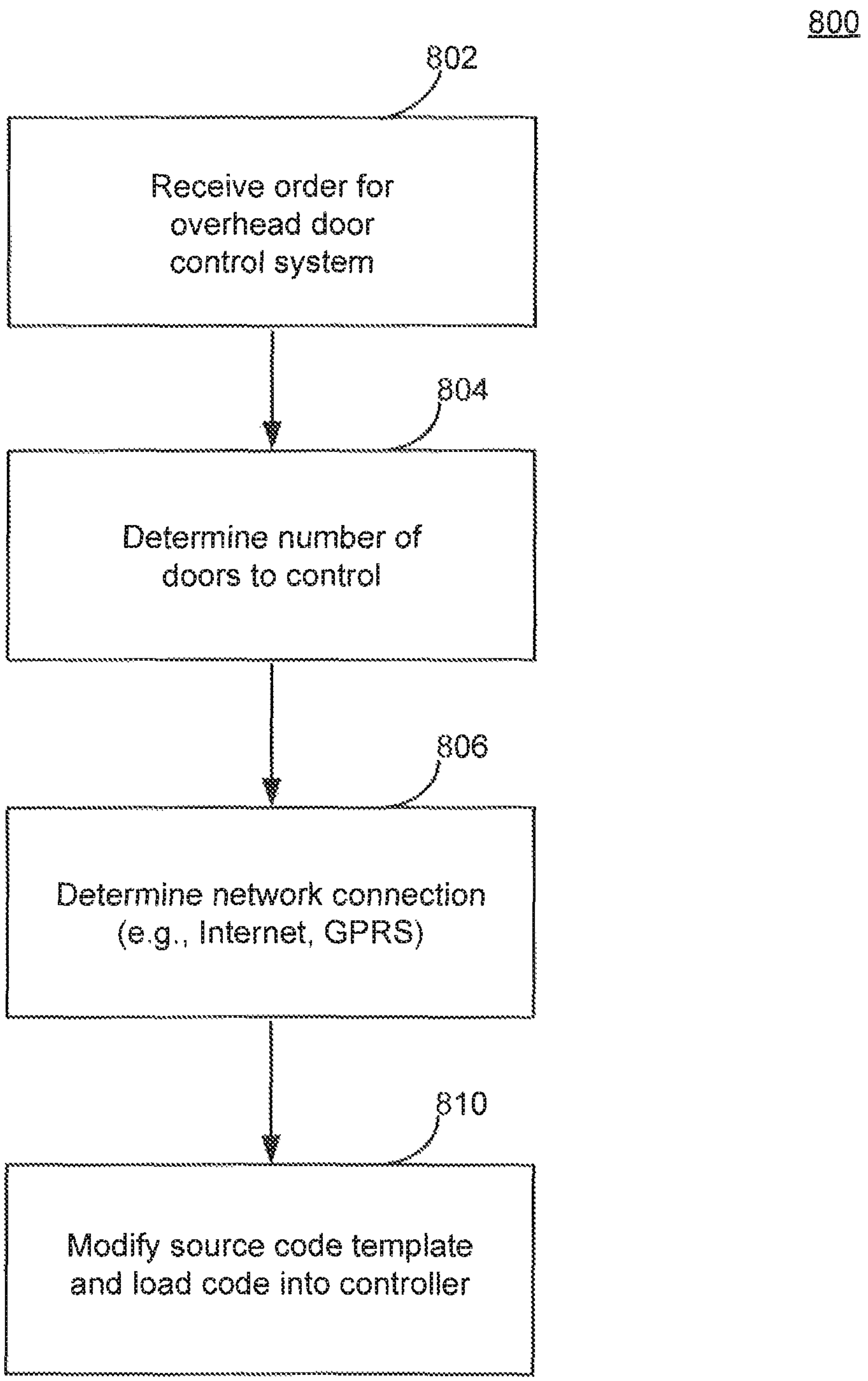
FIG. 8 shows a flowchart depicting an exemplary process for receiving and processing an order for a door control system.

Whether a user is interested in purchasing or leasing a door control system, however, and with reference now to FIG. 8, a user may place an order (and a distributor system, for example, may receive the order) for a door control system (step 802). A user may place such an order over the Internet, for example, using a computing device, such as a PC. A user may also place such an order via telephone, and/or via mail, if desired. In response to receiving an order for a door control system, a distributor system may determine a number of doors to be controlled in the requested system (e.g., via a questionnaire or form presented to the user) (step 804). A distributor system may also determine, in response to receiving an order, a type of network connection (e.g., Internet, GPRS, etc. as described above) (step 806). A distributor system may, in addition, request and/or otherwise determine a variety of other information, such as the size of door or doors to be controlled (this may affect a type and/or size of operator supplied or recommended), whether a user would like to purchase and/or lease a door system, and/or whether the user would like a standalone door control system 100, a shared distributed system 700*a*, a shared consolidated system 700*b* and/or 700*c*, and/or a combination of any of these. Having gathered the relevant data, a distributor system may modify a source code template (e.g., a template comprising the instructions necessary to control a default door control system) based upon the data, and, thereafter, load this data into a controller, which may be packaged and shipped to the user.

Systems and methods are described herein in terms of functional block components and various processing steps. It should be appreciated that these functional blocks and processing steps may be realized by any number of hardware and/or software components configured to perform the specified functions. For example, the systems described herein may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as ladder logic, C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the systems may employ any number of conventional techniques for data transmission, signaling, data processing, network control, and the like. Still further, the systems could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the systems described herein may be embodied as a customization of an existing system, an add-on product, upgraded software, a stand alone system, a distributed system, a method, a data processing system, a device for data processing, and/or a computer program product. Accordingly, the systems may take the form of an entirely software embodiment, an entirely hardware embodiment, or an embodiment combining aspects of both software and hardware. Furthermore, the systems and methods may take the form of a computer program product on a computer-readable storage medium having computer-readable program code means embodied in the storage medium. For example, the systems and methods may take the form of a tangible, non-transitory computer-readable medium. Any suitable computer-readable storage medium may be utilized, including hard disks, nonvolatile memory, solid state memory, CD-ROM, optical storage devices, magnetic storage devices, and/or the like.

The systems and methods are described herein with reference to block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto (or coupled to) a general purpose computer, special purpose computer, or other programmable data processing apparatus (e.g., a controller, as described elsewhere herein) to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture comprising a computer-based system for executing these instructions which implements the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes one or more methods, it is contemplated that these may be embodied as computer program instructions on a tangible computer-readable medium, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. §101.

What is claimed is:

1. A system comprising:

a controller for controlling a door, a tangible, non-transitory memory configured to communicate with the controller, the tangible, non-transitory memory having instructions stored thereon that, in response to execution by the controller, cause the controller to perform operations comprising:

defining, by the controller, a limit count that defines a first path of travel for the door;

resetting, by the controller and in response to detection by a first position sensor of a first target, the limit count;

receiving, by the controller, a measured count from a gear tooth sensor, wherein the measured count is a number of detected gear teeth counted by the gear tooth sensor during the translation of the door from a first position to a second position;

comparing, by the controller, the limit count to the measured count, adjusting, by the controller and based upon the comparing, the limit count to define a second path of travel that is different than the first path of travel in response to the limit count being different than the measured count; and performing, by the controller and based on an input from a distributor system, a diagnostic operation on the at least one of the controller, an adjustable speed drive, an operator, or a display.

2. The system of claim 1, further comprising:

determining, by the controller and based upon a comparison of the limit count to the measured count and a signal received from at least one of the first position sensor or the second position sensor, that the limit count is inaccurate; and resetting, by the controller and based upon the determining, the limit count.

3. The system of claim 1, further comprising controlling, by the controller, an output of the adjustable speed drive to deliver an increasing power to an operator based upon a door position.

4. The system of claim 1, wherein the controller is configured to communicate with the operator based upon a predefined input and output map associated with the adjustable speed drive.

5. The system of claim 1, further comprising:

receiving, by the controller, an update from the distributor system.

6. The system of claim 1, further comprising communicating, by the controller, with the display comprising a graphical user interface.

7. The system of claim 1, further comprising monitoring, by the controller, an operational status of the controller.

8. The system of claim 1, further comprising calculating, by the controller, a relative position of a door based upon a comparison of a measured count to the limit count.

9. The system of claim 1, further comprising communicating, by the controller, with a distributor system by way of at least one of a mobile cellular network or an Internet connection.

10. A system comprising:

a controller for controlling a door, a tangible, non-transitory memory configured to communicate with the controller, the tangible, non-transitory memory having instructions stored thereon that, in response to execution by the controller, cause the controller to perform operations comprising:

communicating, by the controller and to a display, a relative door position that is based on a comparison of a measured count to a limit count;

displaying, by the display, an image of a door based on the relative door position; and displaying, by the display and in response to the communicating, the difference between the limit count and the measured count; and performing, by the controller and based on an input from a distributor system, a diagnostic operation on the at least one of the controller, an adjustable speed drive that is communicatively coupled to the controller, an operator that is communicatively coupled to the controller, or the display that is communicatively coupled to the controller.

11. The system of claim 10, further comprising displaying, by the display, the image of the door based upon information about a direction in which the door is traveling.

12. The system of claim 10, further comprising:

communicating, by the controller, diagnostic information to the display; and displaying, by the display, the diagnostic information.

13. The system of claim 10, further comprising:

receiving, by the display, a request for updated functionality; and communicating, by the display, the request to the controller.

14. The system of claim 13, further comprising:

communicating, by the controller, the request to a distributor system; and receiving, by the controller and from the distributor system in response to the request, updated functionality.

15. The system of claim 10, further comprising communicating, by the display and to the controller, information associated with a plurality of doors.

16. A system comprising:

a controller for controlling a door, a tangible, non-transitory memory configured to communicate with the controller, the tangible, non-transitory memory having instructions stored thereon that, in response to execution by the controller, cause the controller to perform operations comprising:

detecting, by the controller, a problem associated with at least one of: the controller, an adjustable speed drive that is communicatively coupled to the controller, an operator that is communicatively coupled to the controller, or a display that is communicatively coupled to the controller; and communicating, by the controller, an alert to a distributor system in response the detecting; and performing, by the controller and based on an input from the distributor system, a diagnostic operation on the at least one of the controller, an adjustable speed drive that is communicatively coupled to the controller, an operator that is communicatively coupled to the controller, or a display that is communicatively coupled to the controller.

17. The system of claim 16, further comprising facilitating, by the controller, remote access by the distributor system.

18. The system of claim 16, further comprising scheduling, by the controller, maintenance with the distributor system according to a predefined maintenance schedule.

19. The system of claim 16, further comprising scheduling, by the controller, maintenance with the distributor system in response to a maintenance request.

20. The system of claim 16, further comprising receiving, by the controller and from a display, a modification to a scheduled maintenance request.

21. A system comprising:

a controller for controlling a door, a tangible, non-transitory memory configured to communicate with the controller, the tangible, non-transitory memory having instructions stored thereon that, in response to execution by the controller, cause the controller to perform operations comprising:

receiving, by the controller and from a distributor system, an authorization to operate, wherein the authorization to operate is granted by the distributor system during a lease term, and wherein the authorization to operate is a command that renders the door capable to operate in response to a command to move from the controller; communicating, by the controller, data associated with the door to a display;

receiving, by the controller and from the display, a command associated with the door; and controlling, by the controller and in response to the receiving the authorization to operate, the door based on the command; and performing, by the controller and based on an input from the distributor system, a diagnostic operation on the at least one of the controller, an adjustable speed drive that is communicatively coupled to the controller, an operator that is communicatively coupled to the controller, or the display that is communicatively coupled to the controller.

22. The system of claim 21, further comprising:

communicating, by the controller, data associated with a plurality of doors to the display;

receiving, by the controller and from the display, a plurality of commands associated with the plurality of doors; and controlling, by the controller, the plurality of doors based on the plurality of commands.

23. The system of claim 21, further comprising:

communicating, by the controller, data associated with a plurality of doors to a plurality of displays;

receiving, by the controller and from the plurality of displays, a plurality of commands associated with the plurality of doors; and controlling, by the controller, the plurality of doors based on the plurality of commands.

24. The system of claim 21, further comprising:

detecting, by the controller, a problem associated with at least one of: the controller, an adjustable speed drive that is communicatively coupled to the controller, an operator that is communicatively coupled to the controller, or a display that is communicatively coupled to the controller; and communicating, by the controller, an alert to a distributor system in response to the detecting.

25. The system of claim 21, further comprising:

resetting, by the controller and in response to detection by a first position sensor of a first target, a limit count;

receiving, by the controller, a signal from a gear tooth sensor;

incrementing, by the controller and based upon the signal from the gear tooth sensor, the limit count; and storing, by the controller and in response to detection by a second position sensor of a second target, the limit count.

26. The system of claim 21, further comprising scheduling, by the controller, maintenance with the distributor system in response to a maintenance request.

27. A system comprising:

a controller for controlling a plurality of doors, a tangible, non-transitory memory configured to communicate with the controller, the tangible, non-transitory memory having instructions stored thereon that, in response to execution by the controller, cause the controller to perform operations comprising:

communicating, by the controller, data associated with the plurality of doors to a display;

receiving, by the controller, a plurality of commands from the display, wherein each of the plurality of commands is associated with a respective one of the plurality of doors; and controlling, by the controller, each of the plurality of doors in response to each of the plurality of commands; and performing, by the controller and based on an input from a distributor system, a diagnostic operation on the at least one of the controller, an adjustable speed drive, an operator, or the display.

28. The system of claim 27, further comprising:

resetting, by the controller and in response to detection by a first position sensor associated with one of the plurality of doors of a first target, a limit count associated with the one of the plurality of doors;

receiving, by the controller, a signal from a gear tooth sensor associated with the one of the plurality of doors;

incrementing, by the controller and based upon the signal from the gear tooth sensor, the limit count; and storing, by the controller and in response to detection by a second position sensor associated with the one of the plurality of doors of a second target, the limit count.

29. The system of claim 27, further comprising:

detecting, by the controller, a problem associated with one of the plurality of doors; and communicating, by the controller, an alert to a distributor system in response to the detecting.

30. The system of claim 27, further comprising scheduling, by the controller, maintenance for one of the plurality of doors with a distributor system according to a predefined maintenance schedule.

31. The system of claim 27, further comprising:

communicating, by the controller and to the display, a relative door position of one of the plurality of doors, wherein the relative door position is based upon a comparison of a measured count to a limit count; and displaying, by the display, an image of the one of the plurality of doors based upon the relative door position.

32. The system of claim 27, further comprising communicating, by the controller and to the display, at least one of: an access attempt associated with one of the plurality of doors or status information associated with the one of the plurality of doors.

33. The system of claim 27, further comprising communicating, by the controller, with a distributor system by way of at least one of a mobile cellular network or an Internet connection.

34. The system of claim 27, further comprising:

communicating, by the controller, data associated with the plurality of doors to a plurality of displays;

receiving, by the controller, a plurality of commands from the plurality of displays, wherein each of the plurality of commands is associated with a respective one of the plurality of doors; and controlling, by the controller, each of the plurality of doors in response to each of the plurality of commands.

35. The system of claim 1, further comprising activating, by the controller and in response to a command from the distributor system, a disabled functionality.

* * * * *